Figure 1:
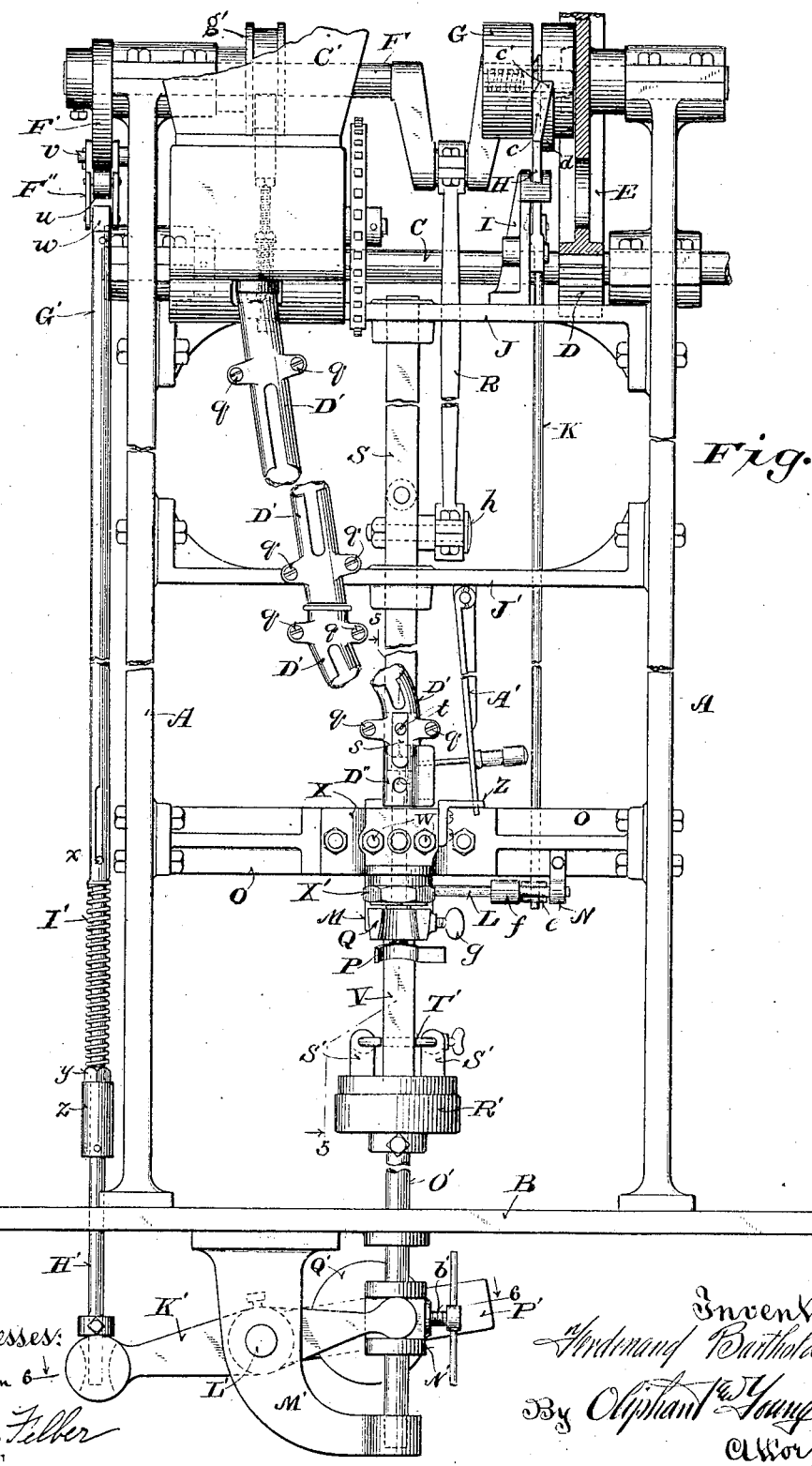

No. 882,612. PATENTED MAR. 24, 1908.
F. BARTHOLD.
CORKING MACHINE.
APPLICATION FILED MAR. 12, 1907.

4 SHEETS—SHEET 1.

No. 882,612. PATENTED MAR. 24, 1908.
F. BARTHOLD.
CORKING MACHINE.
APPLICATION FILED MAR. 12, 1907.
4 SHEETS—SHEET 2.
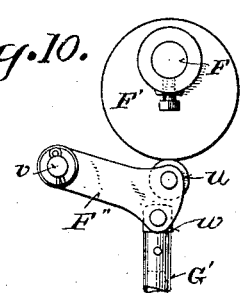
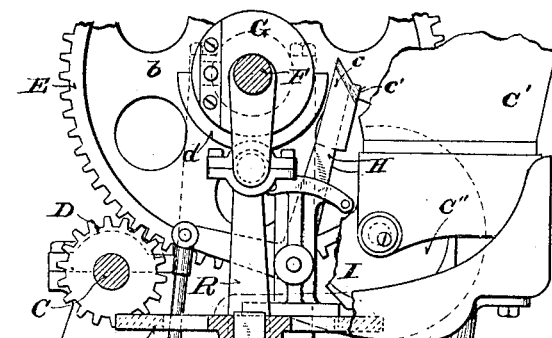
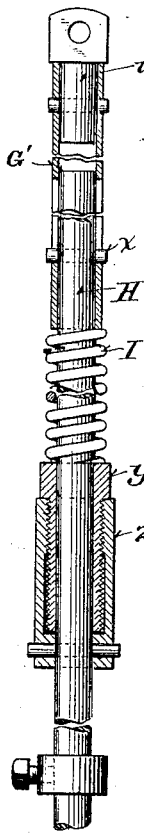
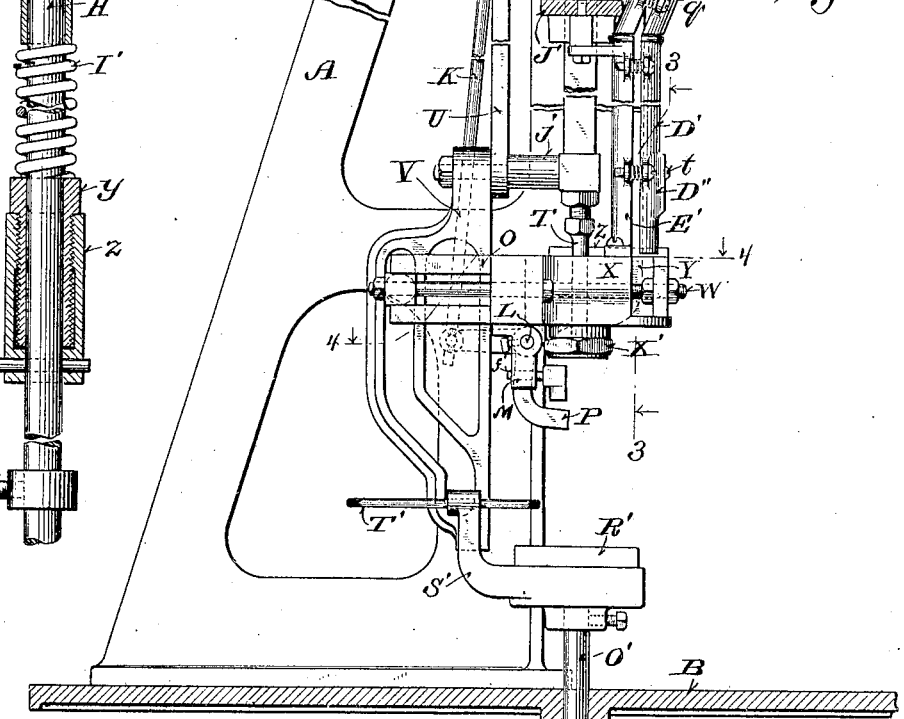

No. 882,612.
PATENTED MAR. 24, 1908.
F. BARTHOLD.
CORKING MACHINE.
APPLICATION FILED MAR. 12, 1907.
4 SHEETS—SHEET 3.
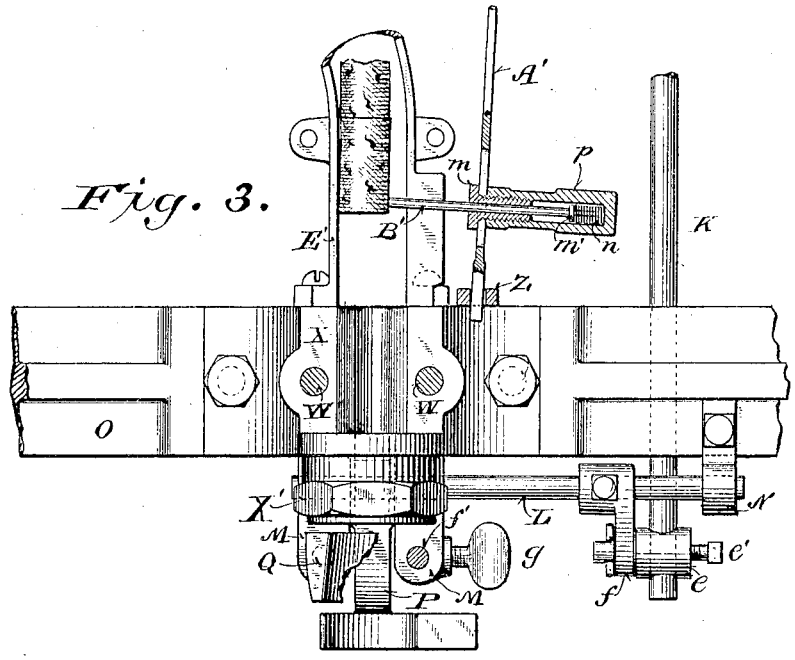
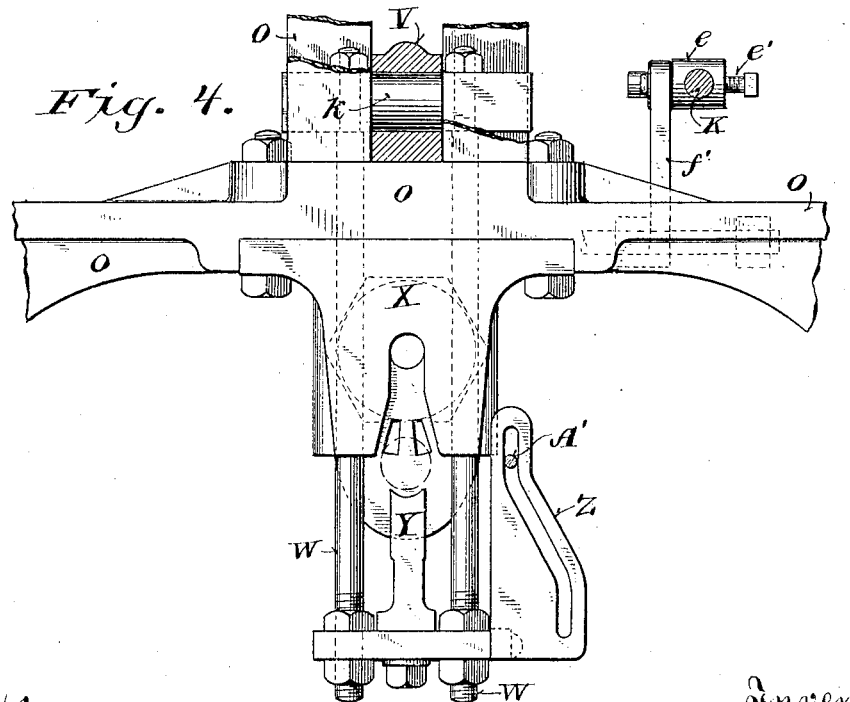

No. 882,612. PATENTED MAR. 24, 1908.
F. BARTHOLD.
CORKING MACHINE.
APPLICATION FILED MAR. 12, 1907.
4 SHEETS—SHEET 4.
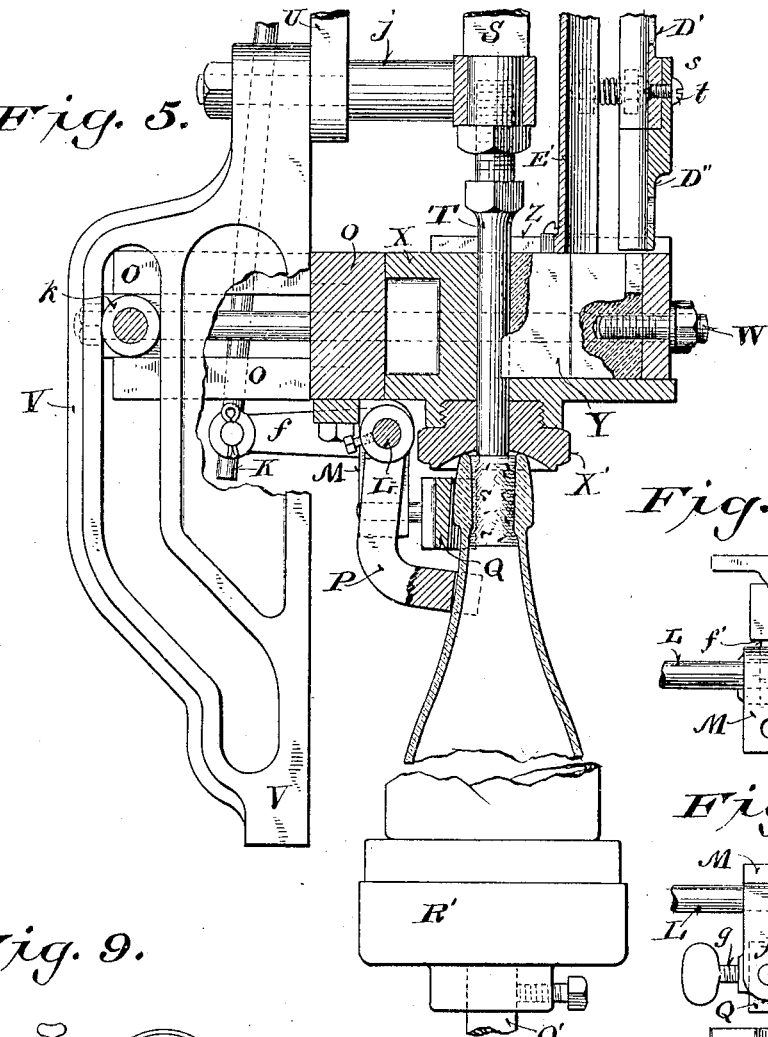
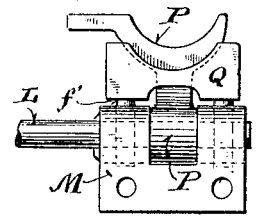
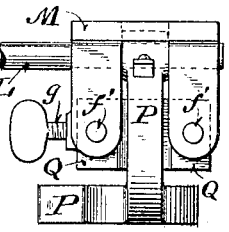
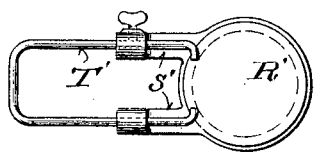
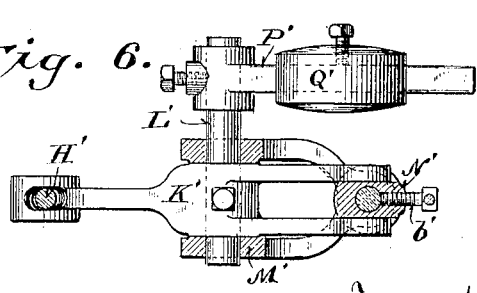
Witnesses:
Fred Palm
George Felber
Inventor:
Ferdinand Barthold
By Oliphant & Young
Attorneys
THE NORRIS PETERS CO., WASHINGTON, D. C.

UNITED STATES PATENT OFFICE.

FERDINAND BARTHOLD, OF MILWAUKEE, WISCONSIN, ASSIGNOR TO THE VILTER MANUFACTURING COMPANY, OF MILWAUKEE, WISCONSIN.

CORKING-MACHINE.

No. 882,612.      Specification of Letters Patent.    Patented March 24, 1908.

Application filed March 12, 1907. Serial No. 362,009.

*To all whom it may concern:*

Be it known that I, FERDINAND BARTHOLD, a citizen of the United States, and resident of Milwaukee, in the county of Milwaukee and State of Wisconsin, have invented certain new and useful Improvements in Corking-Machines; and I do hereby declare that the following is a full, clear, and exact description thereof.

The invention consists in what is herein shown, described and claimed; its object being to provide simple, economical, efficient and practically automatic machines for the speedy corking of bottles without damage to the same.

Figure 1 of the drawings represents a front elevation of my improved corking-machine having parts thereof broken away; Fig. 2, a side elevation of the same having parts thereof broken away and in section; Figs. 3 and 4 sectional views of fragments of the machine respectively indicated by lines 3—3 and 4—4 in Fig. 2; Fig. 5, a side elevation of a fragment of the machine partly in section, the same being indicated by lines 5—5 in Fig. 1; Fig. 6, a view of a portion of the machine partly in horizontal section, the same being indicated by lines 6—6 in Fig. 1; Fig. 7, a plan view of a detail of the machine illustrating a starting trip-mechanism, Fig. 8, a rear elevation of the same detail, Fig. 9, a plan view of a reciprocating bottle-rest in the machine provided with an adjustable bottle-gage, Fig. 10, a side elevation of a detail of the machine, and Fig. 11, a similar view partly in section.

Referring by letter to the drawings, A indicates each of the standards of the machine-frame and B the top of a stand or other suitable support to which said standards are fastened. The standards are provided with bearings for a drive-shaft C, driven by any suitable means, and fast on this shaft is a spur-pinion D in mesh with a spur-wheel E normally loose on a crank-shaft F for which the aforesaid standards are also provided with bearings. A clutch G is fast on the crank-shaft and provided with a spring-controlled bolt $b$ that has engagement with any one of a series of sockets (not shown) with which the spur-wheel hub is provided at intervals of a circle, as shown by dotted lines in Fig. 1, said bolt being normally held in retracted position, by the engagement of a notch of same with the tripper-end $c$ of an arm of a bell-crank H that is fulcrumed in connection with a bracket I rigidly secured on a horizontal brace J of the machine-frame, a portion of the bracket being a segmental guide for the bolt-trip arm of the bell-crank. A semi-circular flange $d$ of the clutch is caught by a lateral extension $c'$ of the tripper-end of the bell-crank aforesaid to prevent overrunning of said clutch when the bolt of same is retracted. However the detail of the clutch-mechanism is immaterial so far as my invention is concerned, and any suitable clutch-mechanism may be utilized to effect a union of the spur-wheel and crank-shaft aforesaid simultaneous with the feed of a bottle to the machine.

A throw-rod K is shown in connection, at its upper end, with the lower arm of the bell-crank H and said rod is held, by a set-screw $e'$, in a swivel-coupling $e$ connected to a crank-arm $f$ of a spindle L that has its bearings in brackets M, N, bolted to a cross-piece O of the machine-frame to depend therefrom. Fast on the spindle is a trip-crank P that has play in a fork of the bracket M, the free end of the crank being concave to permit of it straddling the neck of a bottle.

A bottle-gage Q has rear pins $f'$ that engage the fork-branches of the bracket M, and the gage is held in adjusted position by a set-screw $g$ engaging one of the branches aforesaid against one of said pins, the face of said gage being concave and beveled to conform to the contour of a bottle-neck.

To retard motion of the aforesaid crank-shaft, any suitable brake-mechanism may be utilized, such for instance as a friction-collar $g'$ on said shaft, and an opposing vertically adjustable spring-supported shoe shown by dotted lines in Fig. 1, this construction and arrangement of parts being similar to what is set forth in my application Serial No. 362008, filed March 12, 1907. The shaft F is connected by a pitman R with a stud $h$ of a shank S for which the brace J aforesaid and a similar brace J' are provided with guides. The upper end of a plunger T has detachable vertically adjustable connection with the lower end of the shank. Arms $i, j$, of said shank are joined by a vertical brace-bar U, and hung on the lower one of said arms is a cam-plate V guided on an anti-friction roller $k$ mounted in connection with one end of a cross-frame W that is guided in the cross-piece O of the main frame and a head-block X bolted to the same, said cam-plate and cross-frame being reciprocative at right-angles to each other in a suitably recessed rear portion of said cross-piece. The head-block X is bored and recessed to form a cork-passage in line with the plunger T, the laterally open portion of the passage being flaring and in line with a compressor-block Y in detachable connection with the aforesaid cross-frame. The head-block has a lower section X' in screw-thread connection with the remainder thereof, and the under surface of said section is concave to facilitate engagement therewith of the mouth-end of a bottle. The cross-frame also carries a cam-plate Z engaged by an arm A' in pivotal suspension from the cross-brace J' aforesaid, and guided in the bore of a screw $m$ extending through said arm is an approximately horizontal finger B' having a shoulder $m'$ opposed by a spiral-spring $n$ compressible in a shell $p$ with which said screw has engagement, said pin being extended into a vertical section of a chute depending from a cork-hopper C' having the usual agitator C'' therein, the agitator being driven from the main shaft of the machine, by link-belt and sprocket-gear or otherwise, as may be most convenient or desirable in practice.

Each section of the cork-chute preferably consists of a pair of jaws D', E', having opposing lateral lugs engaged by screws $q$, and spiral-springs $r$ are engaged, under tension, between said opposing lugs. By loosening of tightening the screws $q$ the diameter of the chute is proportioned to that of the corks fed from the hopper aforesaid. The lower portion D'' of the front jaw of the lowermost chute-section is held in detachable connection with the remainder of said jaw, its removal being had when it is desirable to remove the compressor-block Y and substitute another. As a matter of detail, the detachable portion D'' of the cork-jaw D' is provided with a shank $s$ fitting a side recess of the remainder of said jaw, a screw $t$ being employed to fasten said shank in place.

Fast on the crank-shaft F is an eccentric F' in contact with an anti-friction roller $u$ carried by a lever F'' fulcrumed on a stud $v$ of a standard of the machine-frame and coupled to a stem $w$ fast in the upper end of a sleeve G' incasing a rod H' having lugs $x$ engaging longitudinal slots of the sleeve. The lower end of the sleeve is opposed to a spiral-spring I' encircling the rod H' against a tubular tension-screw $y$ loose on said rod and adjustable in a sleeve $z$ that is fastened to the same. The rod extends through the support B and is loose in an eye of one end of a lever K' that is fastened by a set-screw or otherwise on a spindle L' for which a forked bracket M' is provided with bearings. The other end of the lever is forked, and rounded extremities of its branches engage angular side recesses of a sleeve N' adjustably secured, by a set-screw $b'$, on a stem O' guided in the aforesaid support and the lower end of the aforesaid bracket. Fastened to the spindle L' is a crank P', and a weight Q' is adjustably secured on the crank.

A bottle-rest R' is fastened on the upper end of the stem O', by a set-screw or otherwise, and adjustably secured in upwardly extending offset arms S' of the rest is a yoke T' having crooked ends and constituting a bottle-gage.

In Figs. 1, 2 and 5 the various movable parts of the machine are in the position they assume at the completion of a corking operation, the crank-shaft F having made one-half of a revolution, during which time a cork freed from the column in the chute aforesaid has descended into a front lower extension of the head-block X and been compressed in said head-block, in the path of the plunger T, by which plunger it is forced into a bottle automatically chucked between the concave-face of the head-block section X' and the rest R', this rest having been automatically lifted against the resistance of the weight Q', after which there is yielding pressure on said bottle due to the spring-controlled telescopic-connection of the sleeve G' and rod H', whereby crushing strain on the aforesaid bottle during the chucking and corking operations is obviated. During the cork-compressing operation, the cam-plate Z, in connection with the cross-frame W, operates on the pivoted arm A' to move the same from the position shown in Fig. 3 to that shown in Fig. 1, and thus the finger B' is moved out of gripping contact with the opposing cork, the result being a descent of the column of corks in their chute until stopped by the compressor-block Y, the lowermost cork in said chute being then below said finger, and on reverse movement of said cam-plate the cork next above is gripped by the aforesaid finger to for a time support the column, said lowermost cork being then free to drop onto the aforesaid head-block extension when cleared by said compressor-block. Continued revolution of the crank-shaft restores the movable parts of the machine to their normal position, the cross-frame W and parts therewith being retracted, as a result of the upward movement of the cam-plate V, and prior to the time of the completion of the revolution of said crank-shaft, the bottle-rest R' descends to release the previously chucked bottle, which bottle is then removed, the result being an automatic return of the bell-crank H, throw-rod K and trip-crank P to normal position. Hence at about the time of completion of the revolution of the aforesaid crank-shaft, the tripper c engages the notch of the clutch-bolt b to retract the same from its engagement with the spur-wheel E, whereby the machine is brought to rest with the cork-plunger T in elevated position.

To start the machine, a bottle is set on the rest R' abutting the gages Q, T', the result being a rearward swing of the trip-crank P and clutching of the crank-shaft and gear-wheel aforesaid.

Head-blocks of different diameters of bore, corresponding compressor-blocks, plungers and rests may be interchangeably employed to accommodate the machine to corks for bottles of different diameters of mouth, the bottle-rest stem and gages being adjustable to accommodate said machine to bottles of different length and diameter.

I claim:

1. In a corking-machine, the combination of a start-and-stop mechanism comprising a throw-rod and a suitably arranged spindle provided with a pair of cranks one of which has swivel-union with said rod; a reciprocative bottle-rest, a cork-passage head-block against which a bottle is chucked by a movement of said rest, a reciprocative cork-compressor engageable with said block, and a reciprocative plunger by which a compressed cork is forced into a chucked bottle, which bottle actuates the other of the aforesaid cranks when positioned on the aforesaid rest.

2. In a corking-machine, the combination of a reciprocative bottle-rest, a cork-passage head-block against which a bottle is chucked by a movement of said rest, a reciprocative cork-compressor engageable with the head-block, a reciprocative plunger by which a compressed cork is forced into a chucked bottle, a suitably arranged forked bracket, a bottle-gage having pins held in adjustable engagement with the fork-branches of the bracket, and a start-and-stop mechanism comprising a spindle having bearing in said bracket and a trip-crank fast on the spindle between said bracket-branches to have its free end in the path of the bottle when the same is placed on the aforesaid rest to abut said gage.

3. In a corking-machine, the combination of a reciprocative bottle-rest, an adjustable bottle-gage carried by the same, a cork-passage head-block against which a bottle is chucked by a movement of said rest, a reciprocative cork-compressor engageable with said block, a reciprocative plunger by which a compressed cork is forced into a chucked bottle, a suitably arranged bracket, another bottle-gage in adjustable connection with the bracket, and a start-and-stop mechanism comprising a spindle in bearing with said bracket, and a crank fast on the spindle to have its free end in the path of the bottle when the same is positioned on the aforesaid rest to abut said gages.

4. In a corking-machine, the combination of a bottle-rest having a stem loose in guides, a counterweighted lever in connection with the stem, a cork-passage head-block against which a bottle is chucked by a movement of said rest against resistance of the weight governing said lever, means in conjunction with the aforesaid lever by which yielding pressure is had on the bottle subsequent to the chucking of same, means for feed, compression and insertion of a cork in the chucked bottle; and a start-and-stop mechanism arranged to be actuated by said bottle when the same is positioned on the aforesaid rest.

5. In a corking-machine, the combination of a bottle-rest having a stem for which guides are provided, a lever in connection with the stem, a weight-controlled spindle with which the lever is connected and for which suitable bearings are provided, a lever-actuating rod, a sleeve fast on the rod, a tubular tension-screw loose on said rod in engagement with said sleeve, a spiral-spring opposing the screw, another sleeve supported by the spring and in telescopic engagement with the aforesaid rod, a stem fast in the spring-supported sleeve, a lever connected to the stem, and a lever-actuating eccentric on a shaft of the machine; a cork-passage head-block against which a bottle is chucked by a movement of said rest, a reciprocative cork-compressor, a reciprocative plunger by which a compressed cork is forced into a chucked bottle, and a start-and-stop mechanism comprising a trip-crank having yield to the bottle when the same is positioned on the aforesaid rest.

6. The combination of a reciprocative bottle-rest, a cork-passage head-block against which a bottle is chucked by a movement of said rest, a cork-chute having its lower end registered with the head-block, a reciprocative cork-compressor engageable with said block and which has movement across said lower end of the cork-chute to at times gate the same, a pivotally suspended arm provided with a partly shell-like guide, a finger having spring-controlled engagement with the guide and cork-chute, an arm-engaging cam-plate reciprocative with the compressor, a reciprocative plunger by which a compressed cork is forced into a chucked bottle, and a start-and-stop mechanism comprising a trip-crank having yield to the bottle when the same is positioned on the aforesaid rest.

7. In a corking-machine, a cork-chute in sections engageable one with another and each section comprising a pair of jaws having lateral lugs, screws engaging opposing lugs of the jaws and spiral-springs under tension between said lugs.

8. In a corking-machine, the combination of a bottle-rest, upwardly extending offset arms in conjunction with the rest, and a yoke that is adjustably secured in the arms and crooked at its ends to constitute a bottle-gage.

In testimony that I claim the foregoing I have hereunto set my hand at Milwaukee in the county of Milwaukee and State of Wisconsin in the presence of two witnesses.

FERDINAND BARTHOLD.

Witnesses:
N. E. OLIPHANT,
GEORGE FELBER.